(12) United States Patent
Kishimoto et al.

(10) Patent No.: US 6,281,960 B1
(45) Date of Patent: Aug. 28, 2001

(54) LCD WITH BLACK MATRIX WALL(S)

(75) Inventors: Katsuhiko Kishimoto, Nara; Kenji Hamada, Toki; Nobuaki Yamada, Higashiosaka, all of (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/255,335

(22) Filed: Feb. 23, 1999

(30) Foreign Application Priority Data

Feb. 27, 1998 (JP) .................................................. 10-048023
Feb. 18, 1999 (JP) .................................................. 11-040693

(51) Int. Cl.$^7$ ........................................................ G02F 1/13
(52) U.S. Cl. ........................................... 349/156; 349/110
(58) Field of Search .................................. 349/110, 111, 349/166, 155, 156, 153

(56) References Cited

U.S. PATENT DOCUMENTS

| | | |
|---|---|---|
| 5,729,318 | 3/1998 | Yamada et al. . |
| 5,731,111 * | 3/1998 | Yamada et al. ...................... 349/106 |
| 6,061,117 * | 5/2000 | Horie et al. .......................... 349/156 |
| 6,072,557 * | 6/2000 | Kishimoto ........................... 349/156 |
| 6,115,098 * | 9/2000 | Kume et al. ......................... 349/156 |

FOREIGN PATENT DOCUMENTS

| | | |
|---|---|---|
| 6 301015 | 10/1994 | (JP) . |
| 7 120728 | 5/1995 | (JP) . |
| 9 43425 | 2/1997 | (JP) . |
| 9-120072 A | 5/1997 | (JP) . |
| 10-177109 A | 6/1998 | (JP) . |
| 10-177110 A | 6/1998 | (JP) . |

OTHER PUBLICATIONS

English Translation (Patent Abstract) of JP 9–43425, Feb. 14, 1997, "Color Filter and Color Liquid Crystal Display Device Using That", Shinichi et al.

* cited by examiner

*Primary Examiner*—Kenneth Parker
(74) *Attorney, Agent, or Firm*—Nixon & Vanderhye P.C.

(57) ABSTRACT

A liquid crystal display device includes: a first substrate; a second substrate; and a liquid crystal layer interposed between the first and second substrates, wherein the liquid crystal layer includes a plurality of liquid crystal regions separated by a polymer wall formed on the first substrate, liquid crystal molecules within each of the plurality of liquid crystal regions are axially symmetrically aligned with respect to an axis which is perpendicular to the first and second substrates, and the polymer wall is formed from a black resin layer.

11 Claims, 8 Drawing Sheets

FIG.1
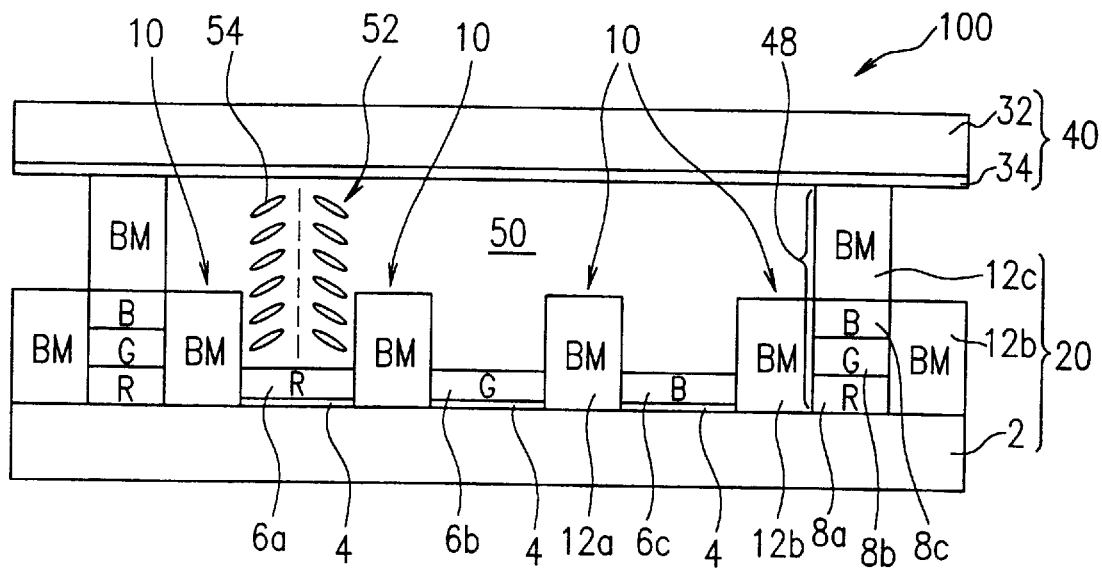
FIG.2 [Unit: μm]
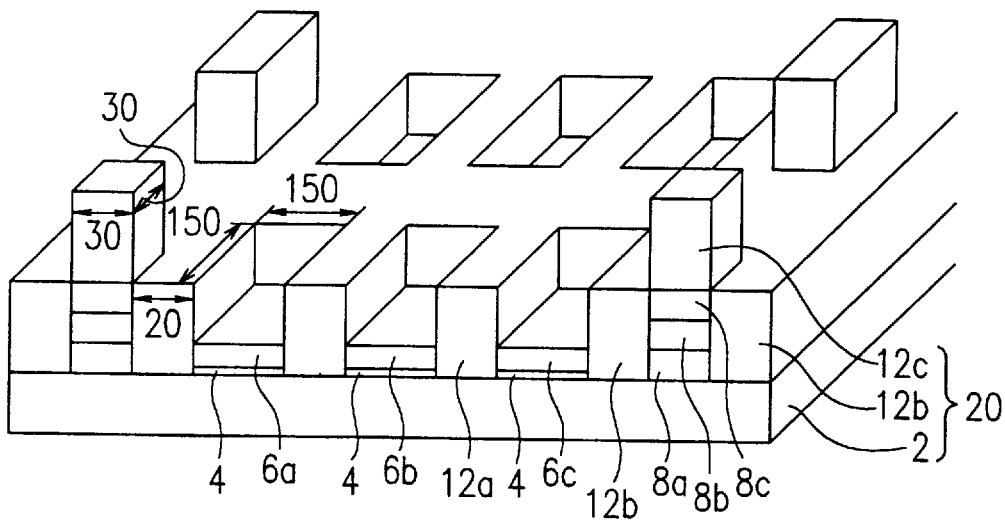

LCD WITH BLACK MATRIX WALL(S)

BACKGROUND OF THE INVENTION

1. Field of the Invention

The present invention relates to a liquid crystal display device and a method of producing the same. In particular, the present invention relates to a liquid crystal display device having liquid-crystal molecules which are axially symmetrically aligned within liquid crystal regions separated by a polymer wall, and a method of producing the same.

2. Description of the Related Art

Conventionally, TN (twisted nematic)- or STN (super-twisted nematic)-type liquid crystal display devices have been used as display devices utilizing electro-optic effects. A technique of increasing a viewing angle of such liquid crystal display devices has been actively developed.

As one of the conventionally proposed techniques of increasing a viewing angle of the TN-type liquid crystal display devices, Japanese Laid-Open Publication Nos. 6-301015 and 7-120728 disclose a liquid crystal display device having axially symmetrically aligned liquid crystal molecules in liquid crystal regions separated by a polymer wall, i.e., a so-called ASM (Axially Symmetrically aligned Microcell)-mode liquid crystal display device. The liquid crystal region substantially surrounded by the polymer wall are typically formed on a pixel-by-pixel basis. The ASM-mode liquid crystal display device has axially symmetrically aligned liquid crystal molecules. Therefore, the variation in contrast is small regardless of the direction in which a viewer views the liquid crystal display device. In other words, the ASM-mode liquid crystal display device has wide viewing-angle characteristics.

The ASM-mode liquid crystal display device as disclosed in the above-mentioned Japanese Laid-Open Publications is produced by polymerization-induced phase-separation of a mixture of a polymeric material and a liquid crystal material.

Hereinafter, a method for producing the conventional ASM-mode liquid crystal display device is described with reference to FIG. 9. First, a glass substrate 308 having a color filter and an electrode on one of the surfaces thereof is prepared (Step (a)). It should be noted that, for simplicity, the electrode and color filter formed on the top surface of the glass substrate 308 are not shown in FIG. 9. A method for forming the color filter will be described below.

Thereafter, a polymer wall 317 for axially symmetrically aligning the liquid crystal molecules is formed on the surface of the glass substrate 308 on which the electrode and color filter are formed (Step (b)). The polymer wall 317 is formed so as to have, for example, a grid pattern. After a photo-sensitive color resin material is applied on the glass substrate 308 by a spin coating method, the resultant glass substrate 308 is exposed to the light through a photomask having a prescribed pattern. Then, the glass substrate 308 is developed, whereby the polymer wall having the grid pattern is formed. The photo-sensitive color resin material may be either of a positive-type or negative-type. Alternatively, the polymer wall 317 may be formed from a non-photo-sensitive resin material, although an additional step of forming a resist film is required.

A pillar 320 is patterned in a discrete manner on the top of a portion of the polymer wall 317 (Step (c)). The pillar 320 is also formed by the exposure and development of a photo-sensitive color resin material.

The surface of the glass substrate 308 on which the polymer wall 317 and the pillar 320 are formed is coated with a vertical-alignment layer 321 such as a polyimide (Step (d)). On the other hand, a counter glass substrate 302 having an electrode formed thereon is supplied (Step (e)), and the counter glass substrate 302 is also coated with the vertical-alignment layer 321 (Step (f)).

These two glass substrates 308 and 302 are laminated to each other with the respective electrodes facing each other, thereby forming a liquid crystal cell (Step (g)). The distance between the two glass substrates (i.e., a cell gap; the thickness of a liquid crystal layer) is defined by the sum of the respective heights of the polymer wall 317 and the pillar 320.

A liquid crystal material 316 is introduced into the liquid-crystal cell gap by, for example, a vacuum injection method (Step (h)). Finally, by, for example, applying a voltage between the electrodes facing each other, liquid crystal molecules within a corresponding liquid crystal region 315 are axially symmetrically aligned (Step (i)). More specifically, the liquid crystal molecules within a corresponding one of the liquid crystal regions separated by the polymer wall 317 are axially symmetrically aligned with respect to the axis (which is perpendicular to the both glass substrates) as shown by a broken line in FIG. 9.

FIG. 10 shows a cross-sectional structure of a conventional color filter. A black matrix (BM) for shielding the gaps between color patterns from light, as well as color resin layers of red (R), green (G) and blue (B) corresponding to the respective pixels are formed on a glass substrate. An overcoat (OC) layer having a thickness of about 0.5 $\mu$m to about 2.0 $\mu$m is formed thereon in order to improve the flatness of the substrate or the like. The overcoat layer is formed from an acrylic resin, an epoxy resin or the like. Moreover, an indium tin oxide (ITO) film for a transparent signal electrode is formed thereon. The BM film is generally formed from a metal chromium film having a thickness of about 100 nm to about 150 nm. The color resin layers are formed from a resin material colored by a dye or pigment, and generally have a thickness of about 1 $\mu$m to about 3 $\mu$m.

The color filter is formed by a method for patterning the photo-sensitive color resin layer formed on the substrate by a photolithography technique. For example, by a series of the steps of forming, exposing and developing a photo-sensitive resin are conducted for each of the R, G and B photo-sensitive color resin materials (i.e., by conducting the series of the steps three times in total), the color filter of R, G and B can be formed. A method for forming a photo-sensitive color resin layer includes a method for applying a liquid, photo-sensitive color resin material (diluted with a solvent) on a substrate by a spin-coating method, and a method for transferring a photo-sensitive color resin material in the form of a dry film onto the substrate. By producing the above-mentioned ASM-mode liquid crystal display device by using such a color filter, a color liquid crystal display device having wider viewing-angle characteristics can be realized.

However, the above-mentioned ASM-mode liquid crystal display device and method for producing the same have the following problems: in the ASM-mode liquid crystal display device, the steps of forming the polymer wall and pillar, which are not required for the TN-type liquid crystal display device, is required in addition to the step of forming a color filter. Therefore, the number of production steps is increased, causing an increase in the cost as well as reduction in the production yield. Moreover, since the production steps are complicated, the polymer wall and pillar may not have a uniform height due to the variation in the conditions of the production steps, thereby causing a divergence in the display characteristics of the liquid crystal display device.

SUMMARY OF THE INVENTION

According to one aspect of the present invention, a liquid crystal display device includes: a first substrate; a second substrate; and a liquid crystal layer interposed between the first and second substrates, wherein the liquid crystal layer includes a plurality of liquid crystal regions separated by a polymer wall formed on the first substrate, liquid crystal molecules within each of the plurality of liquid crystal regions are axially symmetrically aligned with respect to an axis which is perpendicular to the first and second substrates, and the polymer wall is formed from a black resin layer.

In one example, the first substrate includes a color resin layer, the color resin layer including a first color resin layer and a second color resin layer which is formed on the first color resin layer, a protruding portion formed from a black resin layer is formed on a surface of the color resin layer which faces the liquid crystal layer, and a gap between the first and second substrates is defined by the color resin layer and the protruding portion.

In one example, the first substrate further includes a color filter layer including a plurality of color filters provided in respective pixel regions, and the color filter layer is formed from the same material as that of the color resin layer.

In one example, a portion of the polymer wall is formed on the color resin layer at a periphery of at least one of the color filters provided in the respective pixel regions.

In one example, both ends of the polymer wall are formed on respective peripheries of the corresponding color filters provided in the respective pixel regions.

In one example, the black resin layer is formed from a dry film resist.

In one example, the color resin layer is formed from a dry film resist.

According to another aspect of the present invention, a method for producing a liquid crystal display device including a first substrate, a second substrate, and a liquid crystal layer interposed between the first and second substrates, wherein the liquid crystal layer includes a plurality of liquid crystal regions separated by a polymer wall formed on the first substrate, and liquid crystal molecules within each of the plurality of liquid crystal regions are axially symmetrically aligned with respect to an axis which is perpendicular to the first and second substrates, includes the steps of: forming a photo-sensitive black resin layer so as to substantially entirely cover a surface of the first substrate; and exposing and developing the photo-sensitive black resin layer, thereby forming a black resin layer in a region other than a pixel region, the polymer wall being formed from the photo-sensitive black resin layer.

In one example, a method for producing a liquid crystal display device further includes the steps of: forming a photo-sensitive color resin layer of a first color on the first substrate; exposing and developing the photo-sensitive color resin layer of the first color, thereby forming a color filter of the first color and a first color resin layer in a corresponding pixel region; forming a photo-sensitive color resin layer of a second color on the first substrate after the formation of the first color resin layer; and exposing and developing the photo-sensitive color resin layer of the second color, thereby forming a color filter of the second color and a second color resin layer in a corresponding pixel region, wherein the step of forming the black resin layer includes the step of forming a protruding portion formed from a black resin layer on the second color resin layer, and in a step of laminating the first and the second substrates with each other, the first and second color resin layers and the protruding portion which is formed on the second color resin layer define a gap between the first and second substrates.

In one example, the step of exposing and developing the photo-sensitive black resin layer includes the step of forming the black resin layer so as to partially overlap a periphery of at least one of the color filters formed in the respective pixel regions.

In one example, the step of exposing and developing the photo-sensitive black resin layer includes the step of forming both ends of the polymer wall on respective peripheries of the color filters of the first and second colors provided in the corresponding pixel regions.

In one example, a method for producing a liquid crystal display device further includes the steps of: after the step of forming the second color resin layer, forming an overcoat layer for covering the pixel regions on the first substrate; and forming a transparent electrode on the overcoat layer, wherein the photo-sensitive black resin layer is formed thereafter.

In one example, the photo-sensitive color resin layer of the first color, the photo-sensitive color resin layer of the second color and the photo-sensitive black resin layer are formed by using a dry film method.

Hereinafter, functions of the present invention will be described.

According to a liquid crystal display device according to the present invention, a liquid crystal layer interposed between first and second substrates includes a plurality of liquid crystal regions separated by a polymer wall, and liquid crystal molecules are axially symmetrically aligned with respect to an axis which is perpendicular to the substrates. Since the polymer wall is formed from a black resin layer for black mask, the black resin layer functions both as a black mask and a polymer wall for separating the liquid crystal regions. A portion of each liquid crystal region, which is located above the polymer wall, has degraded viewing-angle characteristics, since liquid crystal molecules are not axially symmetrically aligned therein. However, since the polymer wall is formed from the black resin layer for black mask, such a portion of the liquid crystal region can be masked by the polymer wall. Since the polymer wall and black mask can be produced by the same production step, the polymer wall need not be formed separately. Thus, the number of production steps as well as the production cost can be reduced, whereby a reduction in yield can be prevented.

In the case where the first substrate further includes a color resin layer including a first color resin layer and a second color resin layer formed on the first color resin layer, and the color resin layer has a protruding portion formed from a black resin layer on the side of the liquid crystal layer, the color resin layer and the protruding portion together function as a spacer for defining a cell thickness. Therefore, a spacer such as a pillar need not be formed separately. As a result, the number of production steps as well as the production cost can be reduced, whereby a reduction in yield can be prevented.

In the case where the first substrate further has a color filter layer including a plurality of color filters provided in each pixel region, and the color filter layer is formed from the same material as that of a color resin layer, the color resin layer can be used as a color filter in each pixel region.

Therefore, the number of production steps as well as the production cost can be reduced, whereby a reduction in yield can be prevented.

In the case where a portion of the polymer wall is formed on the color resin layer at a periphery of at least one of the color filters provided in the respective pixel regions, or both ends of the polymer wall are formed on the respective peripheries of the corresponding color filters provided in the respective pixel regions, only a portion of the black resin layer which overlaps the color resin layer can be used as a polymer wall for axially symmetrically aligning liquid crystal molecules. As a result, a thickness of a spacer for defining a cell thickness can be increased, so that a liquid crystal material can be more easily introduced into the cell. Moreover, a margin for the alignment accuracy of the color resin layer and the black resin layer can be increased, whereby the production cost can be reduced.

In the case where each of the black resin layer and the color resin layer is formed from a dry film resist, the accuracy of the thickness of the color resin layer or the black resin layer as well as the total thickness of the color resin layer and the black resin layer which are stacked on top of each other, is improved. Accordingly, a high-display-quality liquid crystal display device, which prevents non-uniformity of a display resulting from a non-uniform thickness of the cell thickness and/or an uneven height of the polymer wall, can be provided.

According to a method for producing a liquid crystal display device of the present invention, a photo-sensitive black resin layer formed to substantially entirely cover a surface of the first substrate is exposed and developed, whereby the black resin layer is formed in a region other than pixel regions. Thus, a polymer wall for axially symmetrically aligning the liquid crystal molecules is formed. Accordingly, the polymer wall can be produced in the step of forming a black mask which is generally required for the step of forming a color filter substrate. Therefore, the polymer wall need not be formed separately. As a result, a method for producing a liquid crystal display device capable of increasing a viewing angle, reducing the number of production steps and the production cost, as well as preventing a reduction in yield, can be provided.

A color filter of a first color as well as a first color resin layer are formed in a corresponding pixel region on the first substrate, and a color filter of a second color as well as a second color resin layer are formed on the first color resin layer. Moreover, a protruding portion is formed on the second color resin layer, and the first and second color resin layers together with the protruding portion define the gap between the first and second substrates. Therefore, the first and second color resin layers and the protruding portion, which will later function as a spacer, can be formed in the respective steps of forming a color filter and forming a black mask, which are generally required for the step of forming a color filter substrate. Therefore, the spacer need not be formed separately. Accordingly, a liquid crystal display device capable of increasing a viewing angle, reducing the number of production steps and the production cost, as well as preventing a reduction in yield, can be provided.

Thus, the invention described herein makes possible the advantages of (1) providing a liquid crystal display device having wider viewing-angle characteristics as well as excellent display quality, and (2) providing a relatively simple method for producing the same.

These and other advantages of the present invention will become apparent to those skilled in the art upon reading and understanding the following detailed description with reference to the accompanying figures.

BRIEF DESCRIPTION OF THE DRAWINGS

FIG. 1 is a schematic cross sectional view of a liquid crystal display device according to Example 1 of the present invention;

FIG. 2 is a schematic perspective view of a color filter substrate of the liquid crystal display device according to Example 1 of the present invention;

DESCRIPTION OF THE PREFERRED EMBODIMENTS

Figure 3A:
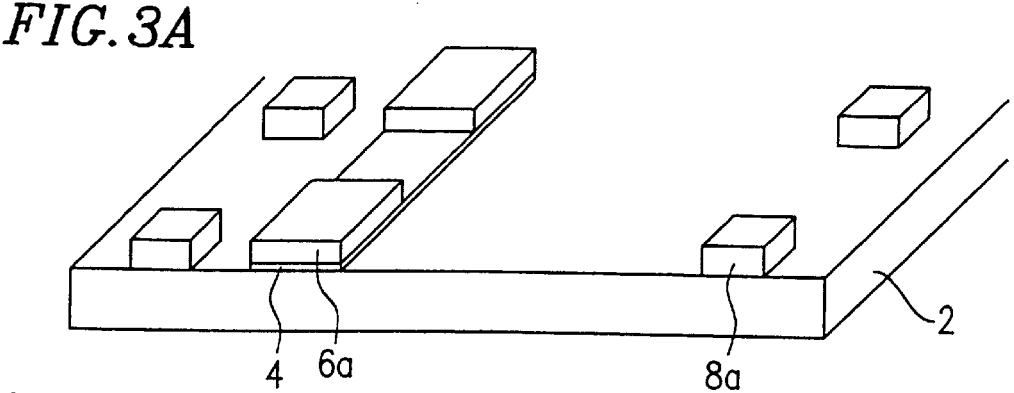
FIGS. 3A to 3D are schematic perspective views illustrating the steps of producing the color filter substrate of the liquid crystal display device according to Example 1 of the present invention.

Hereinafter, Examples of the present invention are specifically described with respect to the accompanying drawings.

EXAMPLE 1

FIG. 1 is a schematic cross sectional view of a liquid crystal display device 100 according to Example 1 of the present invention. FIG. 2 is a schematic perspective view of a color filter substrate 20 (first substrate) of the liquid crystal display device 100. The liquid crystal display device 100 has a color filter substrate 20, a counter substrate (second substrate) 40, and a liquid crystal layer 50 interposed between the color filter substrate 20 and the counter substrate 40.The color filter substrate 20 includes, on a glass substrate 2, stripe-shaped, transparent signal electrodes 4 (which extend in the direction perpendicular to the plane of the figure), Red (R), Green (G) and Blue (B) color filters 6a, 6b and 6c, a polymer wall 10, a pillar 12c, and color resin layers 8a, 8b and 8c. The polymer wall 10 is formed from a black resin layer 12a having a light-shielding property and functioning as a black matrix. The stacked color resin layers 8a, 8b and 8c and the pillar (protruding portion) 12c formed thereon will later function as a spacer 48 for defining the distance between the color filter substrate 20 and the counter substrate 40. The pillar 12c has a light-shielding property and is formed from a black resin. A vertical alignment film (not shown) is formed on the surface of the color filter substrate 20 which faces the liquid crystal layer 50.

The counter substrate 40 includes a glass substrate 32, stripe-shaped, transparent scanning electrodes 34 formed on the glass substrate 32, and a vertical alignment film (not shown) formed on the transparent scanning electrodes 34. The liquid crystal layer 50 interposed between the color filter substrate 20 and the counter substrate 40 is divided into a plurality of liquid crystal regions 52 by the polymer wall 10. The liquid crystal molecules 54 within each liquid crystal region 52 are axially symmetrically aligned with respect to the axis which is perpendicular to a glass substrate 2.

Hereinafter, a method for producing the liquid crystal display device 100 is described with reference to FIGS. 3A to 3D.

On the glass substrate 2 having the stripe-shaped transparent electrodes 4, the color filter 6a and the color resin layer 8a are formed by using a red dry film resist. The color resin layer 8a will later function as a part of the spacer 48 for defining the distance between the substrates. A photosensitive acrylic resin mixed with a red pigment powder is used as the red dry film resist. After the red dry film resist is transferred onto the glass substrate 2 at a temperature of about 110° C. to about 130° C., the resultant glass substrate 2 is exposed to light by using a mask having a prescribed pattern. Thereafter, the substrate 2 is developed and post-baked at about 220° C. for about 1 hour, whereby the color filter 6a and the color resin layer 8a are formed (FIG. 3A). The color resin layer 8a will later function as a part of the spacer 48 for defining the distance between the substrates. The color filter 6a (pixel) has a size of about 150 μm×150 μm, the color resin layer 8a (pillar) has a size of about 30 μm×30 μm, and the polymer wall 10 has a width of about 20 μm (see FIG. 2).

Figure 3B:
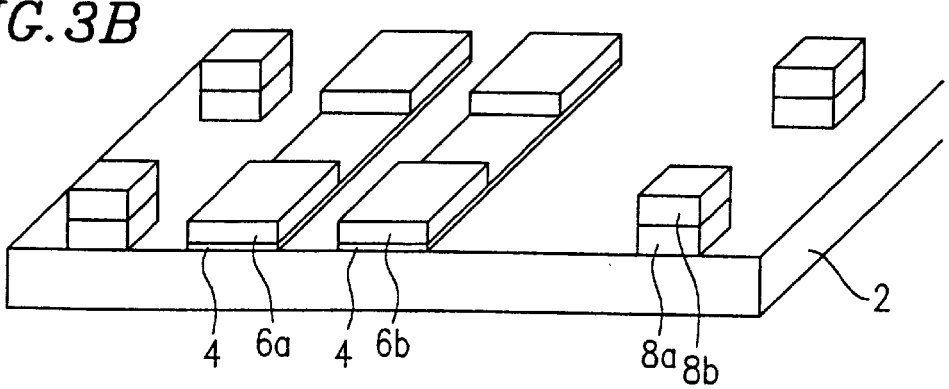
Figure 3C:
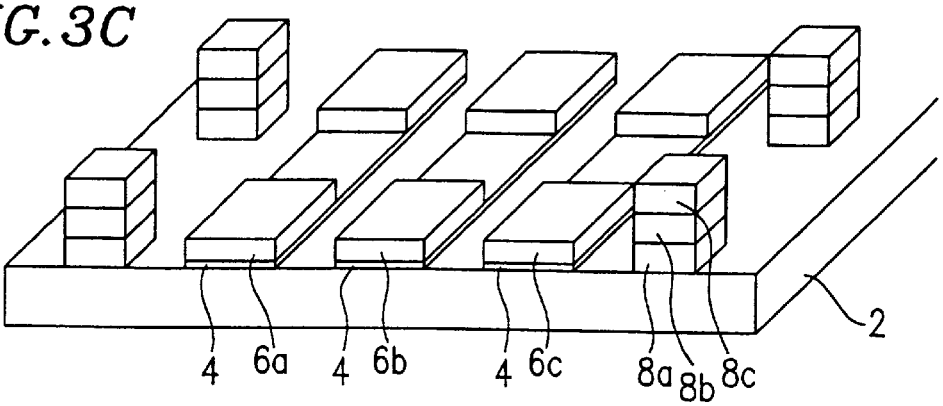

Thereafter, by using a green dry film resist, the color filter 6b and the color resin layer 8b are formed. The color resin layer 8b will later function as a part of the spacer 48 for defining the distance between the substrates. The color resin layer 8b is formed on the color resin layer 8a (FIG. 3B). Moreover, by using a blue dry film resist, the color filter 6c and the color resin layer 8c are formed. The color resin layer 8c will later function as a part of the spacer 48 for defining the distance between the substrates. The color resin layer 8c is formed on the color resin layer 8b (FIG. 3C). Each of the red, green and blue dry film resists has a thickness of about 1.2 μm.

Figure 3D:
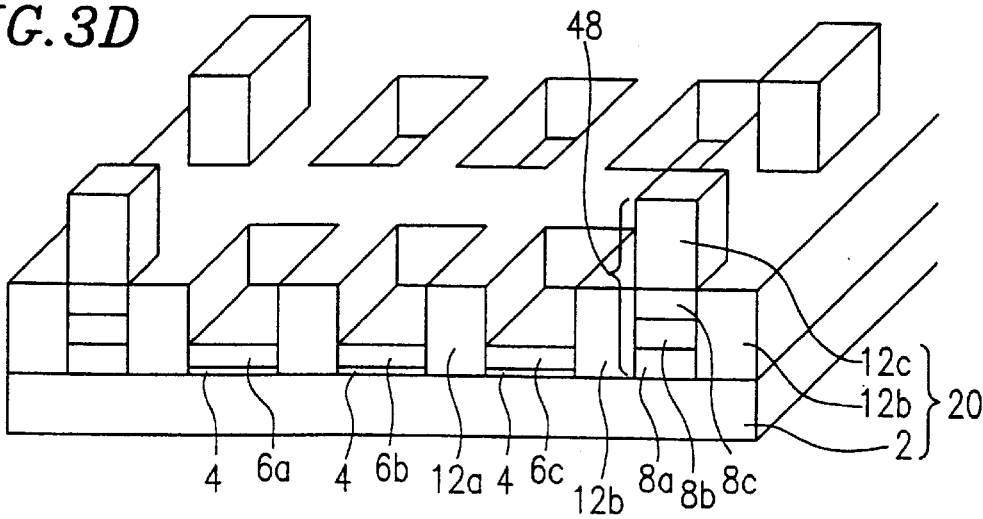

Then, a light-shielding, photo-sensitive black resin layer (BM) is applied on the whole surface of the glass substrate by a dry film resist method, and a portion of the black resin layer which is formed on the red, green and blue color filters 6a, 6b and 6c are removed by using a photolithography technique (FIG. 3D). Each of the black resin layers 12a and 12b has a thickness of about 3.6 μm. The black resin layer 12c formed on the color resin layer 8a, 8b and 8c forms a pillar. The black resin layer 12a functions both as a black mask and as the polymer wall 10 for separating the liquid crystal regions. Moreover, the black resin layers 12b and 12c together with the stacked color resin layers 8a, 8b and 8c function as a black mask. The stacked color resin layers 8a, 8b and 8c as well as the pillar 12c formed thereon will later function as the spacer 48 for defining the gap between the substrates. The number of such color resin layers and pillars may be appropriately set in view of pressure resistance of the liquid crystal display device 100, injection speed of the liquid crystal material, and the like. Moreover, the size of the pillar 12c may appropriately be changed.

By forming the color filters 6a, 6b and 6c, the color resin layers 8a, 8b and 8c, and the black resin layers 12a, 12b and 12c by a dry film resist method, the variation in the thickness (i.e., the reduction in a thickness) can be substantially reduced to zero. Therefore, a cell thickness is about 6 μm (about 3.6 μm+ about 3.6 μm–about 1.2 μm), and a substantial height of the polymer wall 10 for axially symmetrically aligning the liquid crystal molecules is about 2.4 μm (about 3.6 μm–about 1.2 μm), whereby a uniform structure can be formed on the whole surface of the color filter substrate 20. By conducting the above-mentioned steps, the color filter can be formed simultaneously with the polymer wall 10 and the pillar 12c.

Then, the surface of the color filter substrate 20 on which the polymer wall 10 and the pillar 12c are formed is coated with a vertical-alignment layer (e.g., "JALS-204" by JSR). Moreover, the surface of the glass substrate 32 on which the scanning electrodes 34 are formed is coated with the vertical-alignment layer. Then, the counter substrate 40 and the color filter substrate 20 are laminated to each other, thereby producing a liquid crystal cell.

A mixture including an n-type liquid crystal material (Δε=–4.0, Δn=0.08, and a chiral angle of about 90° for about 5 μm) and 0.3% by weight of a compound A given by the following formula as a photo-curable resin, and about 0.1% by weight of Irgacure 651 is injected into the liquid crystal cell.

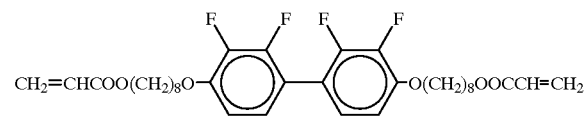

By applying a voltage (e.g., about 5 V) between the transparent electrodes 4 and 34, the liquid crystal molecules 54 which have been aligned perpendicularly to the vertical alignment film (not shown) are oriented parallel to the substrates (i.e., perpendicular to the electric field), whereby the axial symmetric alignment (with respect to the axis shown by a broken line in FIG. 1) is obtained. Moreover, by irradiating the liquid crystal layer 50 with, for example, ultraviolet light (6 mW/cm$^2$; 365 nm) for about 10 minutes while simultaneously applying a voltage which is higher than a threshold voltage by about 0.5 V (i.e., a voltage of about 2.5 V), the photo-curable resin in the mixture is cured, whereby an alignment regulating element (i.e., pre-tilt) for regulating the axial symmetric alignment is formed. Thus, the axial alignment of the liquid crystal molecules 54 can be rapidly reproduced.

In the liquid crystal display device 100 thus produced, defective orientation of the liquid crystal molecules and non-uniformity of the gap between the substrates were not observed. Thus, a liquid crystal display device having a wide viewing angle can be obtained.

According to the present example, each of the red, green, blue and black resin layers is formed by a dry film resist method. However, other methods which are commonly used, such as spin coating method or roll coating method, may alternatively be used as long as the reduction in a thickness of the layers can be sufficiently suppressed.

The dry film resist method has advantages that the thickness of the resin layer is uniform even when a liquid crystal display device having a large area is formed, and that the variation in the thickness of the resin layers (i.e., the reduction in a thickness) can be substantially reduced to a negligible amount. In particular, after the formation of the polymer wall on the glass substrate, it is further difficult, due to the unevenness of the glass substrate, to again apply a polymeric resin material with a desired thickness on the top of the polymer wall formed on the glass substrate. The total thickness of the polymer wall and pillar corresponds to a cell thickness of the liquid crystal cell. When the variation in the cell thickness is increased, a defective display may be caused. Moreover, in the case where the aperture ratio of the polymer wall is increased in order to improve the brightness of the display, the lateral width of the polymer wall is correspondingly reduced, making it significantly difficult to form the pillar with a required thickness on the top of the polymer wall. The dry film resist method does not have such problems, allowing for production of a high-quality display device with excellent reproducibility.

Moreover, in the liquid crystal display device 100 of the present example, since the color filter is formed between the electrodes 4 and the liquid crystal layer 50, a voltage applied to the liquid crystal layer 5 is affected by the dielectric constant and thickness of the color filter. In view of this, the dry film resist method is preferable in order to optimize the thickness of the color filter. This is because, in the dry film resist, a film thickness can be more desirably controlled compared to other film-applying methods.

In the present example, the present invention is described in terms of a simple-matrix type liquid crystal display device. However, the present invention is not limited to the simple-matrix liquid crystal display device, and may be applied to an active-matrix type liquid crystal display device. Moreover, the transmission-type liquid crystal display device 100 is described in the present example. However, it should be understood that the present invention may be applied to a reflection-type liquid crystal display device.

EXAMPLE 2

Figure 4:
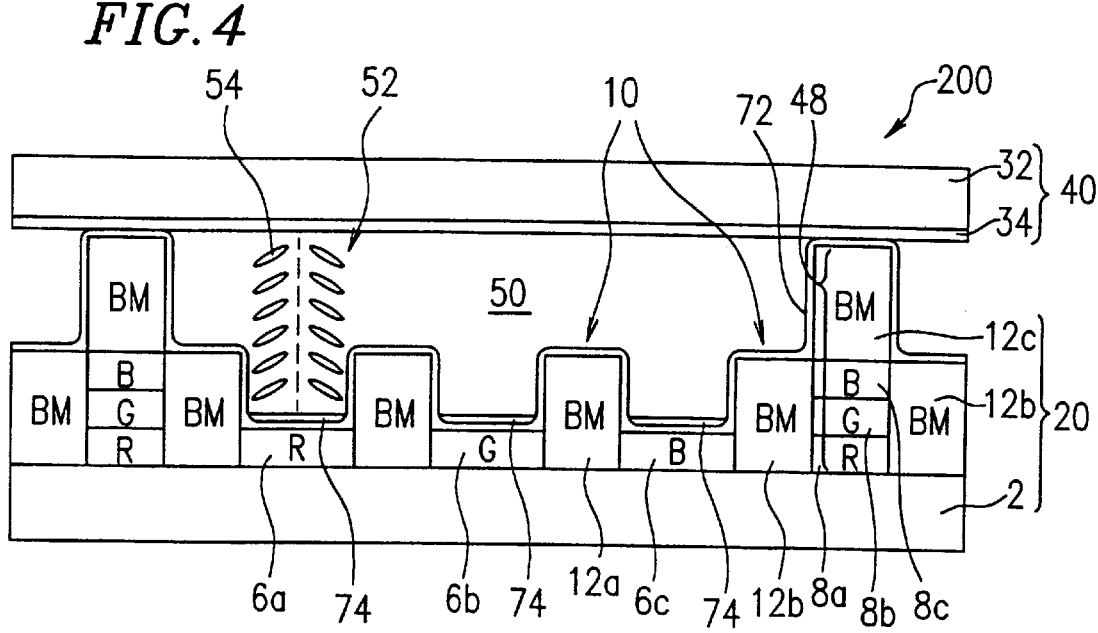
FIG. 4 is a schematic cross sectional view of a color filter substrate of a liquid crystal display device according to Example 2 of the present invention.

FIG. 4 shows a liquid crystal display device 200 according to Example 2 of the present invention. The liquid crystal display device 200 is different from the liquid crystal display device 100 in that the liquid crystal display device 200 has an overcoat layer 72 on a color filter and that transparent electrodes 74 are formed on the overcoat layer 72. Elements having the same function as that of the elements of the liquid crystal display device 100 are denoted by the same reference numerals and characters, and detailed description thereof is omitted.

Preferably, the overcoat layer 72 has a thickness of about 200 nm to about 500 nm. The overcoat layer 72 having a thickness of less than about 200 nm does not effectively smooth the edge of the polymer wall, causing disconnection of the transparent electrodes. On the other hand, the overcoat layer 72 having a thickness of more than about 500 nm hinders the alignment control by the polymer wall, and also causes a reduction in transmittance. The transparent electrodes 74 having a stripe shape are formed by forming a thin film such as ITO on the overcoat layer 72 and etching the thin film into a stripe shape.

According to Example 2, since the transparent electrodes 74 are formed closer to the liquid crystal layer 50 than the color filter is, a voltage applied to the liquid crystal layer 50 is not affected by the capacitance of the color filter. Therefore, a wider range of materials and structures can be used in/for the color filer.

EXAMPLE 3

In Example 3, a liquid crystal display device capable of increasing a process margin for producing a color filter substrate, as well as a production method thereof will be described.

Figure 5A:
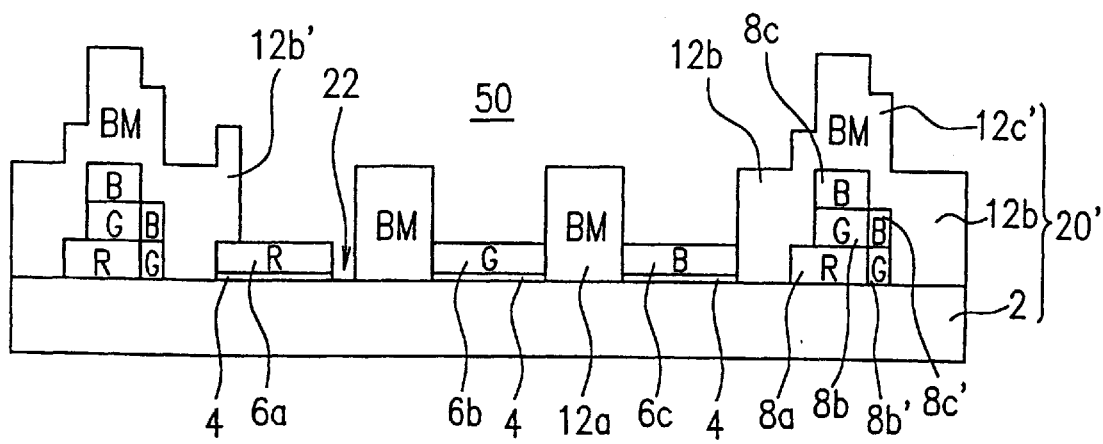
FIGS. 5A and 5B are schematic cross sectional views each showing a defective production state of the color filter substrate of the liquid crystal display device according to Example 1 of the present invention.

In the liquid crystal display device of Example 1 or 2, the process margin is relatively small. For example, in the steps of forming the color filters 6a, 6b and 6c and/or the color resin layers 8a, 8b and 8c of a color filter substrate 20' of FIG. 5A, when the color filter(s) and/or the layer(s) are formed to be shifted from their prescribed position(s) in any of the steps, light leakage may occur at one side of a corresponding pixel (indicated by reference numeral 22 of FIG. 5A). Moreover, the height of a polymer wall 12b' located at the periphery of corresponding pixels is different from the height of another polymer wall 12b which is in contact with the same liquid crystal layer 50, whereby the effect of regulating the axially symmetric alignment of the liquid crystal molecules is hindered, which may result in a reduction in display quality. FIG. 5A shows the case where the color filter 6a and the color resin layer 8a are formed to be shifted from their respective prescribed positions. In this case, a gap 22 is formed on one side of the color filter 6a, causing the light leakage. Moreover, since the color resin layers 8b and 8c are not accurately formed on the color resin layer 8a, color resin layers 8b' and 8c' are formed, whereby a black resin layer 12c' formed thereon does not have a prescribed shape.

Figure 5B:
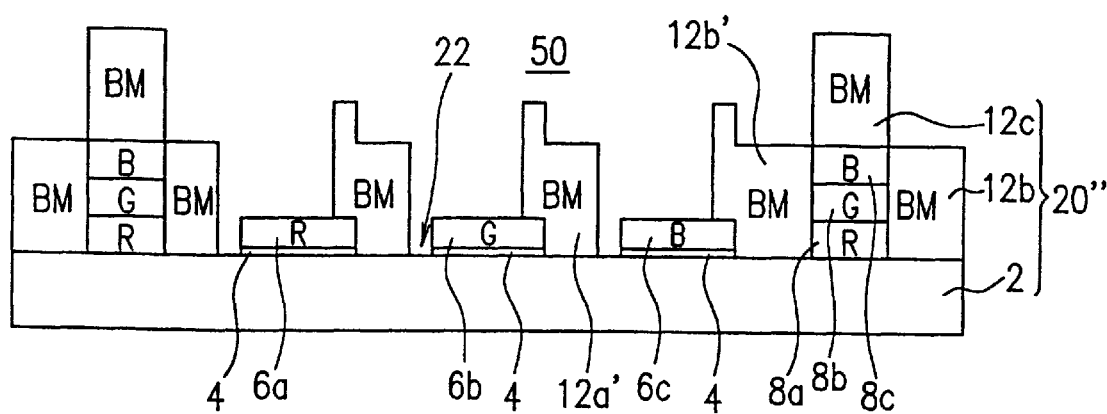

Moreover, in FIG. 5B, in the case where the black resin layers 12a, 12b and 12c are formed to be shifted from their respective prescribed positions, a gap 22 is formed in every pixel, causing light leakage. Since each of polymer walls 12a' and 12b' has different heights on both sides, liquid crystal molecules are defectively oriented in every pixel, which may result in a significant reduction in a display quality and/or degradation in viewing-angle characteristics.

Figure 6:
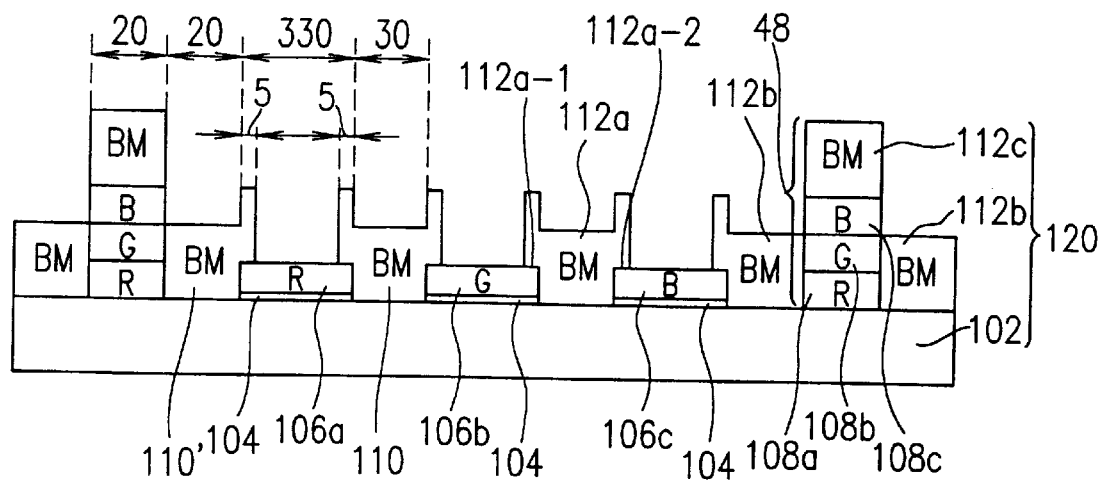
FIG. 6 is a schematic cross sectional view of a color filter substrate of a liquid crystal display device according to Example 3 of the present invention.
Figure 7:
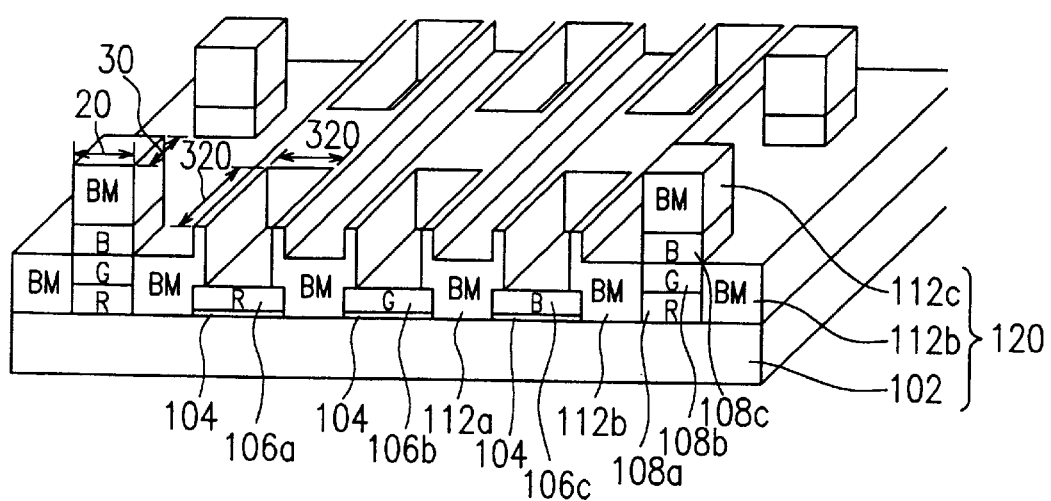
FIG. 7 is a schematic perspective view showing the color filter substrate of the liquid crystal display device according to Example 3 of the present invention.

Although the color filters 6a, 6b and 6c, as well as the color resin layers 8a, 8b and 8c, have a dot-shape in the above examples, the color filters and color resin layers have a stripe-shape in the present example. Moreover, as shown in FIGS. 6, 7 and 8A to 8D, black resin layers 112a and 112b each functioning as a black mask are formed so as to overlap the peripheries of respective color filters 106a, 106b and 106c. FIG. 6 is a schematic cross sectional view of a color filter substrate 120, and FIG. 7 is a schematic perspective view of FIG. 6. In the present example, each of the black resin layers 112a and 112b overlaps the peripheries of the corresponding color filters 106a, 106b and 106c by about 5 µm. The black resin layers 112a and 112b as well as the color filters 106a, 106b and 106c can be basically formed by the same process as that of the above examples. Moreover, as in the case of Example 2, transparent electrodes may be formed on an overcoat layer.

Hereinafter, a method for producing the liquid crystal display device 100 is described briefly with reference to FIGS. 8A to 8D.

Figure 8A:
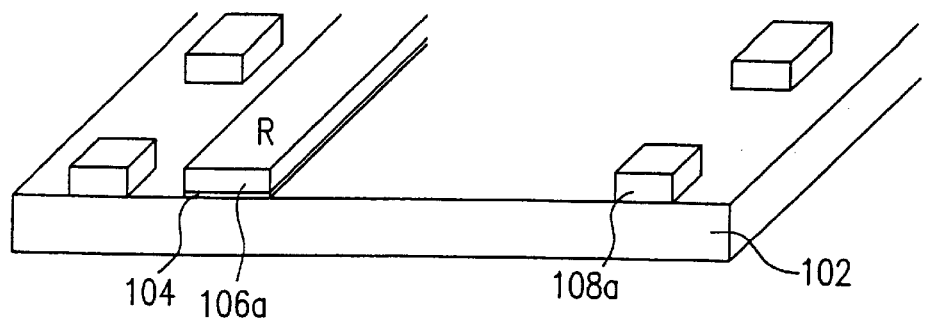
FIGS. 8A to 8D are schematic perspective views illustrating the steps of producing the color filter substrate of the liquid crystal display device according to Example 3 of the present invention.

On the glass substrate 102 having stripe-shaped transparent electrodes 104, the stripe-shaped color filter 106a and the color resin layer 108a are formed by using a red dry film resist. The color resin layer 108a will later function as a part of the spacer 48 for defining the distance between the substrates (FIG. 8A).

Figure 8B:
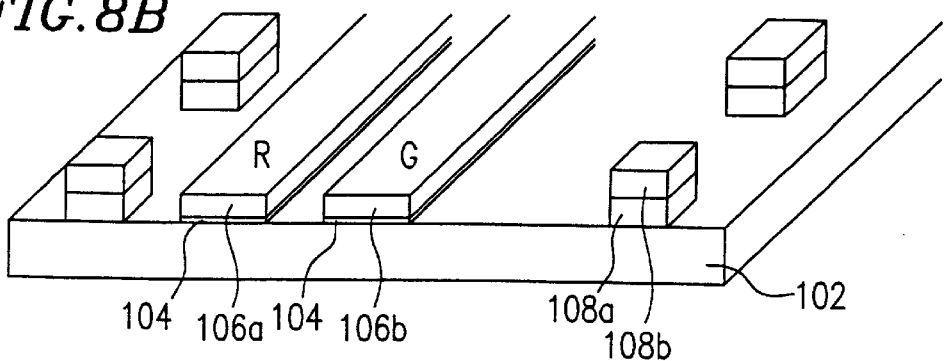
Figure 8C:
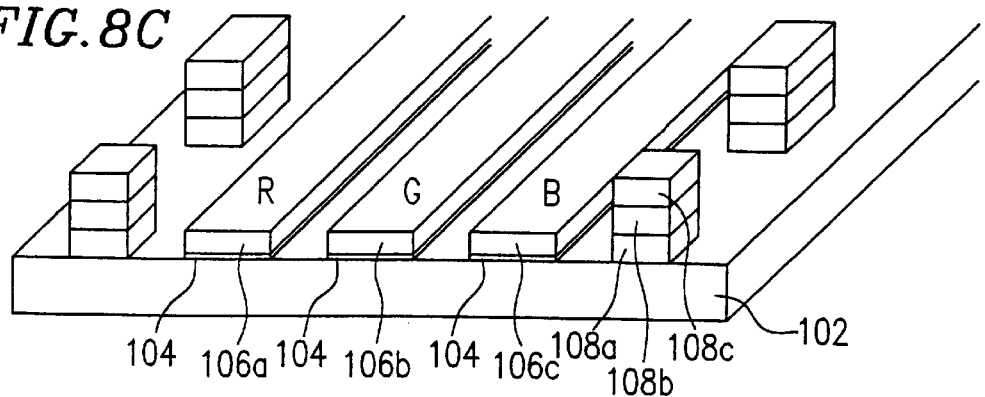

Then, the stripe-shaped color filter 106b and the color resin layer 108b are similarly formed by using a green dry film resist. The color resin layer 108b will later function as a part of the spacer 48 for defining the distance between the substrates. The color resin layer 108b is formed on the color resin layer 108a (FIG. 8B). Moreover, the stripe-shaped color filter 106c and the color resin layer 108c are similarly formed by using a blue dry film resist. The color resin layer 108c will later function as a part of the spacer 48 for defining the distance between the substrates. The color resin layer 108c is formed on the color resin layer 108b (FIG. 8C).

Figure 8D:
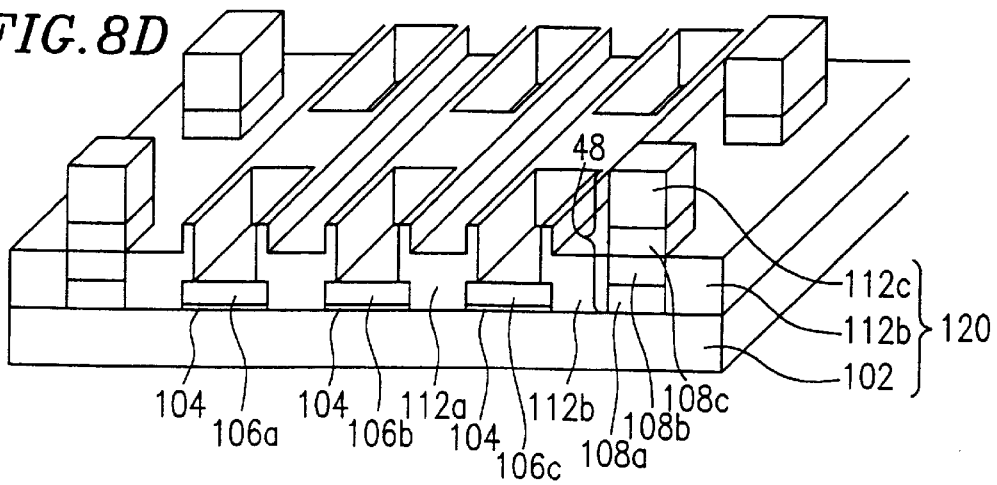
Figure 9:
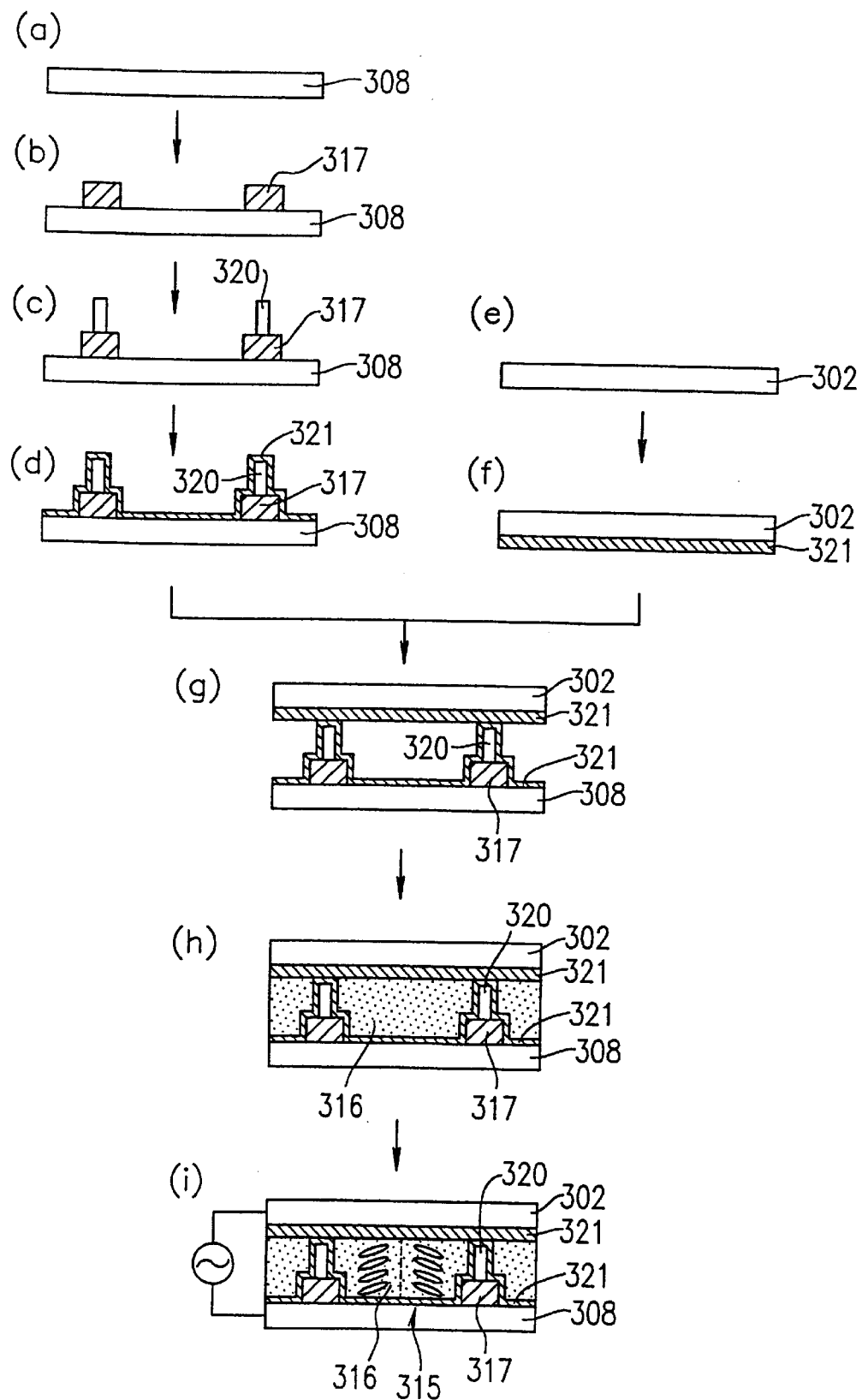
FIG. 9 shows a series of schematic cross sectional views illustrating a method for producing a conventional liquid crystal display device.
Figure 10:
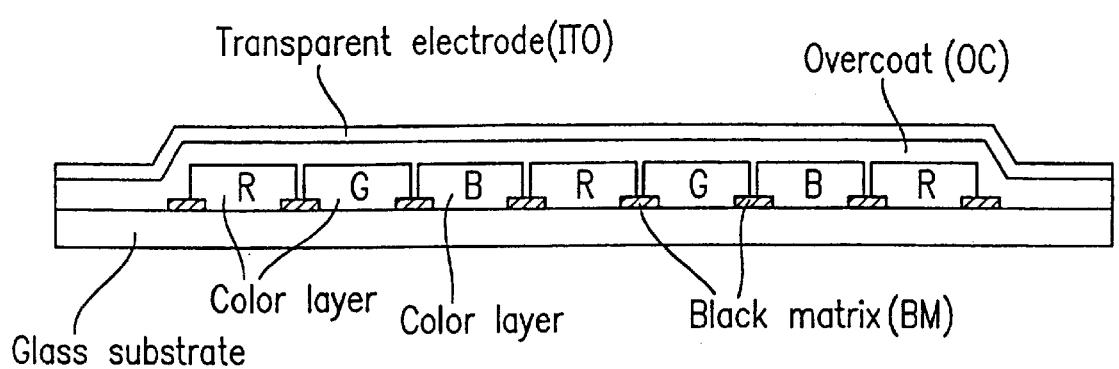
FIG. 10 is a schematic cross sectional view showing a conventional color filter substrate.

Thereafter, a light-shielding, photo-sensitive black resin layer (BM) is applied on the whole surface of the glass substrate by a dry film resist method. A portion of the black resin layer which is formed on the red, green and blue color filters 106a, 106b and 106c are removed by using a photo-lithography technique such that each of the black resin layers 112a and 112b each functioning as a black mask partially overlaps the periphery of at least one of the color filters 106a, 106b and 106c (FIG. 8D).

In the present example, each of the color filters 106a, 106b and 106c has a width of about 330 μm. Moreover, each of (i) an end of a polymer wall 110 formed from the black resin layer and having a width of about 40 μm, and (ii) an end of a polymer wall 110' formed from the black resin layer and having a width of about 25 μm overlaps the periphery of the color filter 106a by about 5 μm. Each pixel has a size of about 320 μm× about 320 μm, and the color resin layer 108a (pillar) has a size of about 20 μm× about 30 μm (see FIGS. 6 and 7).

Thus, by forming the color filters 106a, 106b and 106c with a stripe-shape, a margin for the accuracy of aligning the black resin layers 112a, 112b and 112c in the direction in which the stripe-shaped color filters 106a, 106b and 106c extend can be significantly increased, achieving improvement in the yield as well as reduction in the production cost.

Moreover, each of the black resin layers 112a and 112b functioning as a black mask is formed so as to overlap the peripheries of the corresponding color filters 106a, 106b and 106c, whereby a margin for the accuracy of aligning the black resin layers 112a, 112b and 112c in the direction perpendicular to the direction in which the stripe-shaped color filters 106a, 106b and 106c extend can be obtained corresponding to the overlapping width of the black resin layers and the color filters. In the example shown in FIG. 6, a margin of about 5 μm can be obtained. For example, both ends 112a-1 and 112a-2 of the black resin layer 112a preferably overlap the respective peripheries of the color filters 106b and 106 c, as shown in FIG. 6.

Moreover, by forming each of the black resin layers 112a and 112b so as to overlap the peripheries of the corresponding color filters 106a, 106b and 106C, a substantial height of each polymer wall which is in contact with the respective liquid crystal region can be increased. Since each of the black resin layers 112a and 112b has a lower height at a portion other than the portion overlapping the respective color filters 106a, 106b and 106c, liquid crystal molecules of an introduced liquid crystal material can sufficiently travel within the respective liquid crystal regions. Therefore, sufficient alignment regulation of the liquid crystal molecules can be assured without sacrificing the speed of introducing the liquid crystal material.

In the above examples, a liquid crystal display device having a color filter of three colors (i.e., R, G and B) is described. However, a color display can be provided as long as the liquid crystal display device has a color filter of at least two colors. Therefore, the present invention is not limited to the above examples. Moreover, a single structure, which includes (i) the polymer wall formed from the black resin layer and (ii) the spacer including the stacked color resin layers and the pillar, is provided for each set of R, G and B. However, the present invention is not limited to such a structure.

As described above, according to the present invention, a polymer wall for dividing a liquid crystal layer into a plurality of liquid crystal regions is formed from a black resin layer, whereby the polymer wall need not be formed separately. Therefore, a liquid crystal display device capable of reducing the number of production steps and hence the production cost, as well as preventing a reduction in yield, can be provided. A portion of each liquid crystal region, which is located above the polymer wall, has degraded viewing-angle characteristics, since liquid crystal molecules are not axially symmetrically aligned therein. However, since the polymer wall is formed from the black resin layer for black mask, such a portion of the liquid crystal region can be masked by the polymer wall.

In the case where a color resin layer is formed on the substrate, and a protruding portion formed from a black resin layer is further formed on the surface of the color resin layer which faces a liquid crystal layer, the color resin layer and the protruding portion together function as a spacer for defining a cell thickness. Therefore, a spacer such as a pillar need not be formed separately. Thus, the number of production steps as well as the production cost can be reduced, whereby a reduction in yield can be prevented.

In the case where a color filter layer is formed from the same material as that of the color resin layer, the color resin layer can be used as a color filter in each pixel region. Therefore, the number of production steps as well as the production cost can be reduced, whereby a reduction in yield can be prevented.

In the case where a portion of the polymer wall is formed on the color resin layer at a periphery of at least one of the color filters provided in the respective pixel regions, or both ends of the polymer wall are formed on the respective peripheries of the corresponding color filters provided in the respective pixel regions, only a portion of the black resin layer which overlaps the color resin layer can be used as a polymer wall for axially symmetrically aligning liquid crystal molecules. As a result, the thickness of a spacer for defining a cell thickness can be increased, so that liquid crystal material can be more easily introduced into the cell. Moreover, a margin for the alignment accuracy of the color resin layer and the black resin layer can be increased, whereby the production cost can be reduced.

In the case where each of the black resin layer and the color resin layer is formed from a dry film resist, the accuracy of the thickness of the color resin layer or the black resin layer as well as the total thickness of the color resin layer and the black resin layer which are stacked each other, is improved. Accordingly, a high-display-quality liquid crystal display device, which prevents non-uniformity of a display resulting from a non-uniform thickness of the cell thickness and/or an uneven height of the polymer wall, can be provided.

According to the present invention, the polymer wall can be produced in the step of forming a black mask which is generally required for the step of forming a color filter substrate. Therefore, the polymer wall need not be formed separately. As a result, a liquid crystal display device capable of increasing a viewing angle, reducing the number of production steps and the production cost, as well as preventing the reduction in yield, can be provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:
a first substrate;
a second substrate; and
a liquid crystal layer interposed between the first and second substrates, wherein:
the liquid crystal layer includes a plurality of liquid crystal regions separated by at least one polymer wall supported by the first substrate,
liquid crystal molecules within each of the plurality of liquid crystal regions are axially symmetrically aligned with respect to an axis which is perpendicular to the first and second substrates,
the first substrate includes a color resin portion including a first color resin layer and a second color resin layer having a color different than the first color resin layer, said second color resin layer being formed at least partially on said first color resin layer,
the first substrate further including a black resin protruding portion formed on the second color resin layer so that the second color resin layer is disposed between said first color resin layer and said black resin protruding portion,
a thickness of a portion of said liquid crystal layer is defined by the black resin protruding portion and the color resin portion,
the first substrate further including a color filter layer including a plurality of color filters provided in respective pixel regions, the color filter layer including the same material as that of the color resin portion, and
the polymer wall is formed from black resin.

2. A liquid crystal display device according to claim 1, wherein a portion of the polymer wall is formed on the color resin portion at a periphery of at least one of the color filters provided in the respective pixel regions.

3. A liquid crystal display device according to claim 1, wherein both ends of the polymer wall are formed on respective peripheries of the corresponding color filters provided in the respective pixel regions.

4. A liquid crystal display device according to claim 1, wherein a black resin layer is formed from a dry film resist.

5. A liquid crystal display device according to claim 1, wherein the color resin is portion formed from a dry film resist.

6. A method for producing a liquid crystal display device including a first substrate, a second substrate, and a liquid crystal layer interposed between the first and second substrates, wherein the liquid crystal layer includes a plurality of liquid crystal regions separated by at least one polymer wall formed on the first substrate, and liquid crystal molecules within each of the plurality of liquid crystal regions are axially symmetrically aligned with respect to an axis which is perpendicular to the first and second substrates, the method comprising:
forming a photo-sensitive color resin layer of a first color on the first substrate;
exposing and developing the photo-sensitive color resin layer of the first color, thereby forming a color filter of the first color in a first corresponding pixel region and a first color resin layer;
forming a second photo-sensitive color resin layer of a second color different from the first color on the first substrate, after formation of the first color resin layer;
exposing and developing the photo-sensitive color resin layer of the second color, thereby forming a color filter of the second color in a second corresponding pixel region and a second color resin layer at least partially over the first color resin layer;
after forming said first and second color resin layers, forming a photo-sensitive black resin layer so as to substantially entirely cover a surface of the first substrate;
exposing and developing the photo-sensitive black resin layer, thereby forming a black resin layer in a region other than a pixel region, the polymer wall being formed from the photo-sensitive black resin layer;
the step of forming the black resin layer includes the step of forming a protruding portion formed from the black resin layer on the second color resin layer, and
in a step of laminating the first and second substrates with each other, the first and second color resin layers and the protruding portion which is formed on the second color
resin layer define a gap between the first and second substrates.

7. A method for producing a liquid crystal display device according to claim 6, wherein the step of exposing and developing the photo-sensitive black resin layer includes the step of forming the black resin layer so as to partially overlap a periphery of at least one of the color filters formed in the respective pixel regions.

8. A method for producing a liquid crystal display device according to claim 6, where in the step of exposing and developing the photo-sensitive black resin layer includes the step of forming both ends of the polymer wall on respective peripheries of the color filters of the first and second colors provided in the corresponding pixel regions.

9. A method for producing a liquid crystal display device according to claim 8, further comprising the steps of: after the step of forming the second color resin layer, forming an overcoat layer for covering the pixel regions on the first substrate; and forming a transparent electrode on the overcoat layer, wherein the photo-sensitive black resin layer is formed thereafter.

10. A method for producing a liquid crystal display device according to claim 8, wherein the photo-sensitive color resin layer of the first color, the photo-sensitive color resin layer of the second color and the photo-sensitive black resin layer are formed by using a dry film method.

11. A liquid crystal display device, comprising:
a first substrate;
a second substrate;
a liquid crystal layer interposed between the first and second substrates, wherein the liquid crystal layer includes a plurality of liquid crystal regions, and liquid crystal molecules within each of the plurality of liquid crystal regions are axially symmetrically aligned with respect to an axis which is perpendicular to the first and second substrates,
at least one spacer for maintaining a space between said first and second substrates, said spacer comprising a black resin layer and first and second colored layers having respective colors different from one another, wherein said second colored layer is provided over said first colored layer.

* * * * *